(12) United States Patent
Liang et al.

(10) Patent No.: US 10,853,277 B2
(45) Date of Patent: Dec. 1, 2020

(54) SYSTEMS AND METHODS FOR ISOLATING INPUT/OUTPUT COMPUTING RESOURCES

(71) Applicant: Intel Corporation, Santa Clara, CA (US)

(72) Inventors: Cunming Liang, Shanghai (CN); Danny Y. Zhou, Shanghai (CN); David E. Cohen, Hull, MA (US); James R. Harris, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/573,114

(22) PCT Filed: Jun. 24, 2015

(86) PCT No.: PCT/CN2015/082186
§ 371 (c)(1),
(2) Date: Nov. 9, 2017

(87) PCT Pub. No.: WO2016/206012
PCT Pub. Date: Dec. 29, 2016

(65) Prior Publication Data
US 2018/0129616 A1    May 10, 2018

(51) Int. Cl.
*G06F 13/16*   (2006.01)
*G06F 3/00*    (2006.01)
(Continued)

(52) U.S. Cl.
CPC .......... *G06F 13/1668* (2013.01); *G06F 3/00* (2013.01); *G06F 9/5077* (2013.01); *G06F 13/28* (2013.01); *G06F 13/4282* (2013.01); *G06F 9/5011* (2013.01); *G06F 2009/45579* (2013.01); *G06F 2213/0026* (2013.01)

(58) Field of Classification Search
None
See application file for complete search history.

(56) References Cited

U.S. PATENT DOCUMENTS 7,448,044 B1    11/2008    Rust et al.
8,874,833 B1 *  10/2014    Gole .................. G06F 12/0246
                                                       711/103
(Continued)

OTHER PUBLICATIONS

International Search Report and Written Opinion dated Mar. 24, 2016 for International Application No. PCT/CN2015/082166, 12 pages.

(Continued)

*Primary Examiner* — Henry Tsai
*Assistant Examiner* — Christopher A Bartels
(74) *Attorney, Agent, or Firm* — Schwabe, Williamson & Wyatt, P.C.

(57) ABSTRACT

Disclosed herein are systems and methods for isolating input/output computing resources. In some embodiments, a host device may include logic to identify a Process Address Space Identifier (PASID) for a process or container of the host device and logic to associate the PASID with an individual queue pair of a hardware device of the host device, wherein the queue pair includes two complementary queues and wherein the queue pair is owned by the process or container upon association with the PASID. Other embodiments may be disclosed and/or claimed.

24 Claims, 6 Drawing Sheets

(51) Int. Cl.
*G06F 9/50* (2006.01)
*G06F 13/28* (2006.01)
*G06F 13/42* (2006.01)
*G06F 9/455* (2018.01)

(56) References Cited

U.S. PATENT DOCUMENTS

| | | | | |
|---|---|---|---|---|
| 9,432,298 | B1* | 8/2016 | Smith | H04L 49/9057 |
| 2006/0059328 | A1 | 3/2006 | Toyohara et al. | |
| 2008/0209203 | A1* | 8/2008 | Haneda | G06F 21/72 |
| | | | | 713/150 |
| 2010/0235548 | A1 | 9/2010 | Toyohara et al. | |
| 2011/0022818 | A1 | 1/2011 | Kegel et al. | |
| 2013/0097600 | A1* | 4/2013 | Cardona | G06F 9/45558 |
| | | | | 718/1 |
| 2013/0311817 | A1* | 11/2013 | Kim | G06F 1/04 |
| | | | | 713/501 |
| 2014/0189427 | A1* | 7/2014 | Jayaprakash Bharadwaj | |
| | | | | G06F 11/1415 |
| | | | | 714/15 |
| 2014/0198790 | A1* | 7/2014 | Christenson | H04L 43/0811 |
| | | | | 370/392 |
| 2014/0331221 | A1* | 11/2014 | Dong | H04L 45/00 |
| | | | | 718/1 |
| 2014/0359044 | A1* | 12/2014 | Davis | H04L 45/60 |
| | | | | 709/213 |
| 2015/0149666 | A1 | 5/2015 | Wang et al. | |
| 2015/0180782 | A1* | 6/2015 | Rimmer | H04L 49/3045 |
| | | | | 370/236 |
| 2015/0370700 | A1* | 12/2015 | Sabol | G06F 12/0246 |
| | | | | 711/103 |
| 2016/0095110 | A1* | 3/2016 | Li | H04W 72/1215 |
| | | | | 370/329 |
| 2016/0154756 | A1* | 6/2016 | Dodson | G06F 13/4022 |
| | | | | 710/316 |
| 2016/0292099 | A1* | 10/2016 | Davis | G06F 13/28 |
| 2016/0378344 | A1* | 12/2016 | Nachimuthu | G06F 9/4403 |
| | | | | 711/103 |
| 2016/0378545 | A1* | 12/2016 | Ho | G06F 9/50 |
| | | | | 718/107 |
| 2017/0024570 | A1* | 1/2017 | Pappachan | G06F 13/28 |
| 2017/0091108 | A1* | 3/2017 | Arellano | G06F 12/0888 |
| 2017/0187846 | A1* | 6/2017 | Shalev | H04L 69/22 |
| 2017/0199827 | A1* | 7/2017 | Sankaran | G06F 9/45558 |
| 2017/0206166 | A1* | 7/2017 | Kumar | G06F 12/0868 |
| 2018/0088978 | A1* | 3/2018 | Li | G06F 13/28 |
| 2018/0089881 | A1* | 3/2018 | Johnson | G06F 9/45558 |
| 2019/0073160 | A1* | 3/2019 | Okada | G06F 3/0659 |
| 2019/0310959 | A1* | 10/2019 | Iyer | G06F 13/4068 |

OTHER PUBLICATIONS

Extended European Search Report dated Jan. 22, 2019 for European Patent Application No. 15895912.2; 11 pages.

* cited by examiner

FIG. 1

| Field | Bit(s) | Init Val. | Description |
|---|---|---|---|
| PASID | 19:0 | 0b | PASID associated with the queue |
| Reserved | 21:20 | 0b | Reserved |
| Execute Requested | 22 | 0b | Reserved |
| Privileged Mode Requested | 23 | 0b | Reserved |
| PASID EN | 24 | 0b | When set, the PASID TLP is enabled to include the PASID associated with the queue |
| Reserved | 31:25 | 0b | Reserved |

SYSTEMS AND METHODS FOR ISOLATING INPUT/OUTPUT COMPUTING RESOURCES

CROSS REFERENCE TO RELATED APPLICATIONS

The present application is a national phase entry under 35 U.S.C. § 371 of International Application No. PCT/CN2015/082186, filed Jun. 24, 2015, entitled "SYSTEMS AND METHODS FOR ISOLATING INPUT/OUTPUT COMPUTING RESOURCES", which designated, among the various States, the United States of America. The Specifications of the PCT/CN2015/082186 Application is hereby incorporated by reference.

TECHNICAL FIELD

The present disclosure relates generally to the field of computing systems, and more particularly, to isolating Input/Output (I/O) computing resources.

BACKGROUND

Many software applications are designed to run in parallel over multiple processing cores or servers. However, no effective Input/Output (I/O) resource partitioning techniques are available to isolate I/O resources at an adequately small granularity for per-process or per-container assignment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Disclosed herein are systems and methods for isolating input/output computing resources. For example, in some embodiments, a host device may include logic to identify a Process Address Space Identifier (PASID) for a process or container of the host device and logic to associate the PASID with an individual queue pair of a hardware device of the host device, wherein the queue pair includes two complementary queues and wherein the queue pair is owned by the process or container upon association with the PASID. In some embodiments, a hardware device may include logic to identify a PASID associated with a queue pair of the hardware device, wherein the PASID is a PASID of a process or container of the host device; logic to generate a Transaction Layer Packet (TLP) including the PASID; and logic to provide the TLP to a host device of the hardware device as part of a Direct Memory Access (DMA) transaction for the process or container.

On the compute front, processors no longer principally "scale up" by increasing clock frequency. Instead, each generation of processors has been increasing the number of cores. To take advantage of these multiple cores, software may run parallel workloads.

However, advances in parallelism on the compute front have not been matched by advances in parallelism on the network or storage fronts. This is despite the increased bandwidth available on servers (from 1 gigabit per second to 10 gigabits per second, then from 10 gigabits per second to 25 or 40 gigabits per second, with the expectation that 100 gigabits per second or greater will be common in the near future). This is also despite the emergence of non-volatile memory (NVM) technologies that have dramatically increased the performance of storage Input/Output (I/O) (from Serial Advanced Technology Attachment (SATA) and Serial Attached Small Computer Interface (SAS) Solid State Drives (SSDs), to Peripheral Component Interconnect Express (PCIe) and Flash memory, to Non-Volatile Memory Express (NVMe), and to Non-Volatile Dual In-line Memory Modules (NVDIMMs)). NVDIMMs may eliminate I/O by enabling access by the processor to persistent media via memory bandwidth. As storage technology has developed, bandwidth requirements have increased and access latencies have decreased.

It may be desirable to improve on the existing kernel-scheduling model of an operating system platform to enable an application task to run in isolation on its own compute, network, and storage resources. However, partitioning an I/O adapter into several logical devices for independent assignment presents a number of challenges. One such challenge is multiplexing access to memory associated with the adapter; in particular, assigning, to each logical device, a virtual memory region that must be mapped to the underlying physical memory.

The PCIe specification discusses an Address Translation Service (ATS) that may be provided by an I/O Memory Management Unit (IOMMU). However, such an ATS cannot achieve switching functionality that is required for memory accesses originating from an adapter to a virtual memory region associated with a particular logical device (out of several active logical devices). A Single Root I/O Virtualization (SR-IOV) Virtual Function (VF) mechanism may identify these logical devices and register the identifiers with the adapter, but SR-IOV devices split receive and transmit queue pairs in constant stride, preventing a more flexible assignment. Additionally, the number of VFs is statically provisioned, and thus on-demand queue pair allocation and assignment are not supported. Further, SR-IOV does not support the assignment of resources to individual containers or processes within a virtual machine (the "nested case"), and thus there is no mechanism for splitting off queue pair resources from a VF for a particular container or process.

Various ones of the embodiments disclosed herein may provide secure and flexible I/O resource partition systems and methods. For example, various ones of the embodiments disclosed herein include enabling PASID support on a PCIe endpoint, providing a per-queue PASID register used for DMA requests, and performing secure I/O partitioning with software control. Various systems and methods may be usefully applied to partition resources of a PCIe device with multiple queue pairs, and more generally, to any queue pair-based PCIe endpoint that uses DMA to move data between an I/O device and system memory.

Various ones of the embodiments disclosed herein may take advantage of PASID functionality of an IOMMU and the PASID TLP prefix of the PCIe specification. For example, in some embodiments, all DMA requests with Input/Output Virtual Addresses (IOVA) on a specific queue may be tagged with a PASID value that identifies the targeted address space (or guest address space) associated with a process or container to which the queue is assigned. Software may thus fully control the hardware I/O queue partitioning. In some embodiments, a front instance may be able to directly access an assigned I/O resource in a secure fashion, removing the bottlenecks associated with limiting DMA only to privileged software and a front instance with frequency data copying.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware that provide the described functionality. As used herein, the term "Input/Output resource" or "I/O resource" may refer to a hardware-configurable component located in a Peripheral Component Interconnect Express (PCIe) device (e.g., receive/transmit queue pairs and request/response queue pairs). As used herein, the term "container" may refer to an operating system-level virtualization environment for running multiple isolated guest systems on a single control host.

Figure 1:
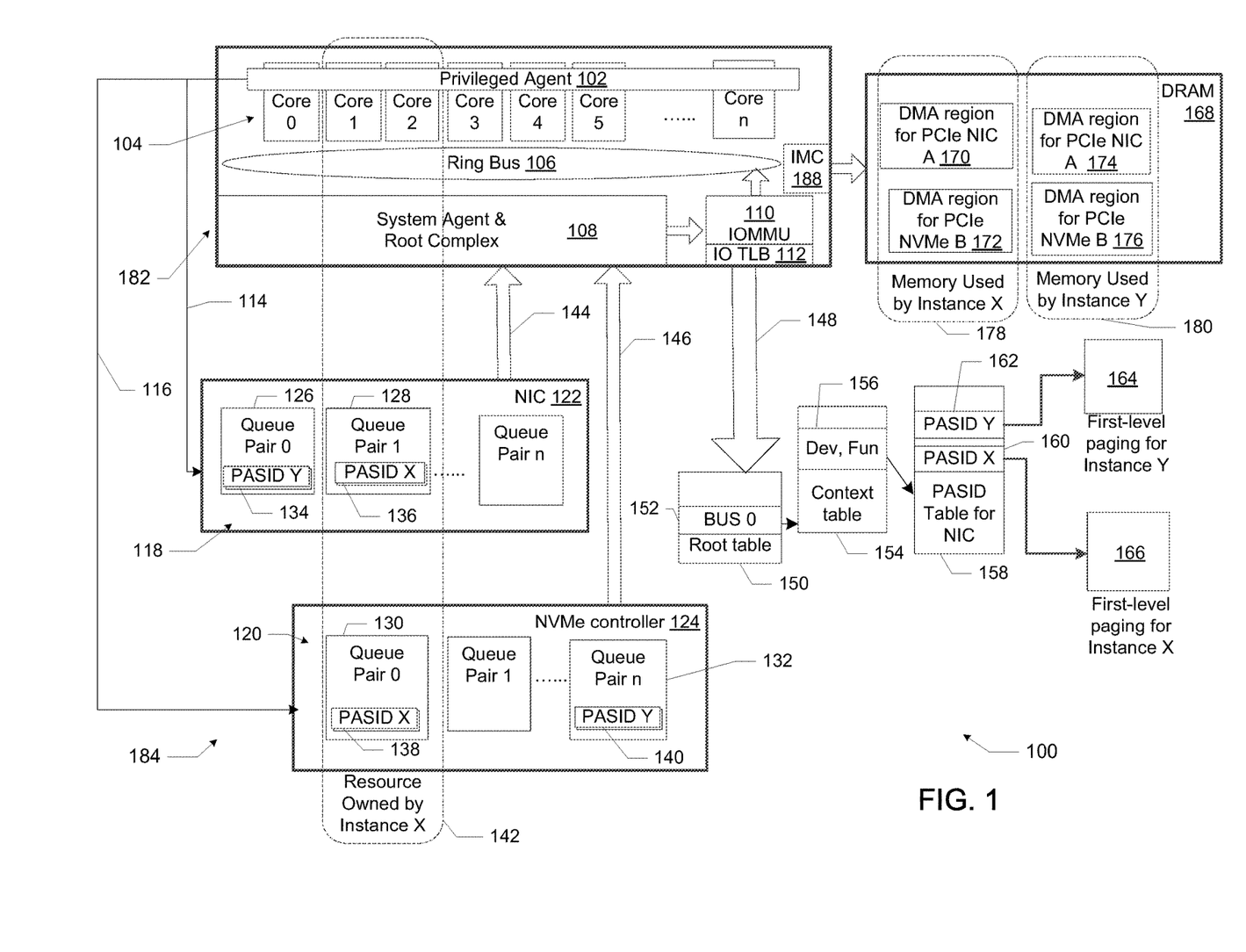
FIG. 1 is a block diagram of an illustrative computing system incorporated with the Input/Output (I/O) resource isolation technology of the present disclosure, in accordance with various embodiments.

FIG. 1 is a block diagram of an illustrative computing system 100 incorporated with the I/O resource isolation technology of the present disclosure, in accordance with various embodiments. The computing system 100 may include a host device 182 and one or more hardware devices 184.

In some embodiments, various components of the host device 182 may be configured to identify a PASID for each of multiple queue pairs of a hardware device 184, wherein each queue pair includes two complementary queues, and allocate a PASID associated with a queue pair to a process or container of the host device 182. The process or container may then use the PASID when utilizing resources of the hardware device 184. In some embodiments, various components of a hardware device 184 may be configured to identify a PASID for a queue pair of the hardware device 184, generate a TLP including the PASID, and provide the TLP to the host device 182 as part of a DMA transaction. These and other embodiments are discussed in detail below.

The host device 182 may include one or more processing cores 104. These processing cores 104 may be assigned, singly or in any desired combination, to various processes or containers running on the host device 182. As used herein, the term "instance" may refer to a process or container. Multiple instances may run in parallel on the host device 182 by having different ones of the processing cores 104 assigned to them. For example, in the computing system 100 of FIG. 1, two of the processing cores 104, Core 1 and Core 2, are shown by the dotted line 142 as assigned to or "owned by" a particular instance, Instance X. Other resources of the computing system 100 may also be assigned to different instances in order to achieve parallel operation, as discussed in detail herein.

The host device 182 may include a system agent and root complex 108. The system agent and root complex 108 may provide system agent functionality by including a Dynamic Random Access Memory (DRAM) Memory Management Unit (MMU) for the DRAM 168 and a display controller. The system agent and root complex 108 may provide root complex functionality by including one or more hardware components that connect processor complexes to the Input/Output (I/O) subsystem and the memory subsystem of the computing system 100.

The host device 182 may include a ring bus 106. The ring bus 106 may provide communications pathway between the cores 104 and other components of the host device 182.

The host device 182 may include an I/O Memory Management Unit (IOMMU) 110 and an I/O Translation Lookaside Buffer (TLB) 112. The IOMMU 110 may be coupled to the I/O TLB 112 and to the ring bus 106. The IOMMU 110 may serve to connect a DMA-capable I/O bus to a main memory, and may map virtual addresses the physical addresses. In some embodiments of the computing system 100, the IOMMU 110 may be used to avoid filling physical addresses directly to a DMA descriptor to avoid the possibility of data being written to an arbitrary memory region via a DMA operation. In particular, the Input/Output Virtual Address (IOVA) may be used to fill a DMA descriptor. The I/O TLB 112 may serve as an address translation cache for translation between guest physical addresses and host physical addresses. The guest physical addresses may refer to the view of physical memory from software running in an instance. The system agent and root complex 108 may be in communication with the IOMMU 110.

The host device 182 may include a privileged agent 102. The privileged agent 102 may be configured to perform various resource isolation operations, such as assigning various ones of the cores 104 to different instances and partitioning I/O resources for different instances, as discussed below. In various embodiments, the privileged agent 102 may include different device kernel drivers for different ones of the hardware devices 184.

The host device 182 may also include an Integrated Memory Controller (IMC) 188. The IMC 188 may manage the flow of data to and from the DRAM 168.

The hardware devices 184 may include any suitable networking and storage hardware devices, such as Peripheral Component Interconnect Extended (PCIe)-compatible networking and storage hardware devices. For example, the hardware devices 184 illustrated in FIG. 1 include a Network Interface Controller (NIC) 122 and a Non-Volatile Memory Express (NVMe) controller 124. The NVMe controller 124 may be configured for accessing solid-state drives (SSDs) in accordance with the Non-Volatile Memory Host Controller Interface Specification (NVMHCI). In various embodiments, the computing system 100 may include more or fewer hardware devices than the examples illustrated in FIG. 1. For example, the computing system 100 may not include any NICs, or may not include any NVMe controllers. The computing system 100 may include two or more NICs (configured as discussed herein with reference to the NIC 122) and/or two or more NVMe controllers (configured as discussed herein with reference to the NVMe controller 124).

The hardware devices 184 may be in communication with the privileged agent 102. FIG. 1 illustrates a communication pathway 114 between the privileged agent 102 and the NIC 122, and a communication pathway 116 between the privileged agent 102 and the NVMe controller 124. The communication pathways 114 and 116 may be used by the privileged agent 102 for partitioning and isolating resources of the NIC 122 and the NVMe controller 124, respectively, between different instances running on the host device 182, as discussed below. Different ones of the hardware devices 184 may include different numbers of queue pairs (and may also support different queue schemes).

Each of the hardware devices 184 may include one or more queue pairs. As used herein, a "queue pair" may refer to two complementary queues (e.g., a receive queue and a transmit queue, a request queue and a response queue, or a submission queue and a completion queue). For example, the NIC 122 may include multiple queue pairs 118, and the NVMe controller 124 may include multiple queue pairs 120. Various ones of the techniques disclosed herein may enable the privileged agent 102 of the host device 182 to assign various queue pairs of the hardware devices 184 to instances running on the host device 182. The granularity of this assignment may be at the individual queue pair level, a capability not achieved by conventional resource assignment techniques.

Each of the hardware devices 184 may be in communication with the system agent and root complex 108. For example, the NIC 122 may be coupled to the system agent and root complex 108 via the communication pathway 144, and the NVMe controller 124 may be in communication with the system agent and root complex 108 via the communication pathway 146.

The computing system 100 may include a root table, one or more context tables, one or more PASID tables, and one or more paging structures. For ease of illustration, FIG. 1 includes a root table 150, a context table 154, a PASID table 158, and first-level paging structures 164 and 166 for the NIC 122, but analogous tables and structures may be present for other hardware devices 184. The I/O TLB 112 may be in communication with the root table 150 via the communication pathway 148.

The root table 150 may map devices to their respective context tables. Entries in the root table 150 may include a context-table pointer that references the context table for devices on the bus associated with the root entry. For example, FIG. 1 illustrates a root entry 152, associated with BUS 0, that includes a pointer to the context table 154. The context table 154 may map specific I/O devices on a particular bus to their respective device domains. Entries in the context table 154 may include a PASID-table pointer that references the PASID table for the domain associated with the context entry. For example, FIG. 1 illustrates a context entry 156 associated with the NIC 122 that includes a pointer to the PASID table 158 for the domain associated with the NIC 122. The value "Dev, Fun" may refer to device and function values for an Alternative Routing Identifier (ARI) (e.g., an ARI of 04:10.1 may corresponding to BUS 04, DEVICE 10, and FUNCTION 1). The PASID table 158 may map PASID values to their respective first-level paging structures. Entries in the PASID table 158 may include a PASID and a root of a first-level translation structure used to translate requests tagged with the corresponding PASID. For example, FIG. 1 illustrates a PASID table entry 160 corresponding to Instance X and containing the root of the first level paging structure 166 for Instance X. FIG. 1 also illustrates a PASID table entry 162 corresponding to Instance Y and containing the root of the first level paging structure 164 for Instance Y.

The hardware devices 184 may include registers for storing PASID values for one or more of the queue pairs therein. In the example of FIG. 1, the NIC 122 may store a PASID, "PASID Y," in a register 134 associated with a queue pair 126 and may store a PASID, "PASID X," in a register 136 associated with a queue pair 128, while the NVMe controller 124 may store "PASID X" in a register 138 associated with a queue pair 130 and "PASID Y" in a register 140 associated with a queue pair 132. As discussed in further detail herein, the PASID values stored in a register associated with a queue pair may indicate which instance of the host device 182 "owns" or has that queue pair assigned to it. In particular, the queue pairs 128 and 130 may be owned by Instance X, while the queue pairs 126 and 132 may be owned by Instance Y.

The host device 182 may include logic to identify a PASID for an instance of the host device 182, and associate the PASID with an individual queue pair of a hardware device 184. Upon association with the PASID, the queue pair may be owned by the instance. As used herein, a queue pair may be "owned by" or "assigned to" an instance when the instance can use the queue pair exclusive of other instances. The logic configured to perform the operations of the host device 182 discussed herein may be distributed among any number of suitable components of the host device 182. For example, in some embodiments, the logic of the host device 182 discussed herein may be included in the privileged agent 102 (which may be, for example, a privileged software agent).

With reference to the example of FIG. 1, the host device 182 may include logic to identify a PASID for Instance X, "PASID X," and may associate PASID X with the queue pair 128 of the NIC 122 and thereby assign the queue pair 128 to Instance X. In some embodiments, the privileged agent 102 may perform this association via the communication pathway 114. The host device 182 may associate this same PASID X with a different queue pair of the NIC 122, or with a queue pair of a different hardware device 184. For example, the host device 182 may associate PASID X with the queue pair 130 of the NVMe controller 124 and thereby assign the queue pair 130 to Instance X. Also illustrated in FIG. 1 is an association of a PASID for Instance Y, "PASID Y," to the queue pair 126 of the NIC 122 and to the queue pair 132 of NVMe controller 124.

In some embodiments, association of a PASID with an individual queue pair of a hardware device 184 may be performed by causing storage of the PASID in per-queue PASID registers of the hardware device 184. A pair of queues may thus be associated with a corresponding pair of per-queue PASID registers. For example, the NIC 122 may include a per-queue PASID register for each of the queues in its queue pairs 118; the pairs of per-queue PASID registers 134 and 136 are shown for the queue pairs 126 and 128, respectively. The pairs of per-queue PASID registers 138 and 140 are also shown for the queue pairs 130 and 132 of the NVMe controller 124. The host device 182 may provide the PASID for a particular instance to the hardware device 184 for storage in per-queue PASID registers corresponding to the queue pair which the host device 182 wishes to assign to the particular instance. For example, the host device 182 may provide the NIC 122 with PASID X for storage in the pair of per-queue PASID registers 136 and PASID Y for storage in the pair of per-queue PASID registers 134 (e.g., via the communication pathway 114). The host device 182 may provide PASIDs to the NVMe controller 124 analogously. In some embodiments, a per-queue PASID register may have a length of 32 bits, or any other suitable length.

The PASID in the per-queue PASID register for a transmit queue of a queue pair should match the PASID in the per-queue PASID for the receive queue of the queue pair. This may be enforced by the host device 182 (e.g., the privileged agent 102) when associating PASIDs with queue pairs. Also, in some embodiments, a per-queue PASID register may be a single register associated with a queue pair, rather than a single queue. Thus, this disclosure may refer to the per-queue PASID register for a queue pair (rather than for an individual queue) for simplicity of notation.

Figure 2:
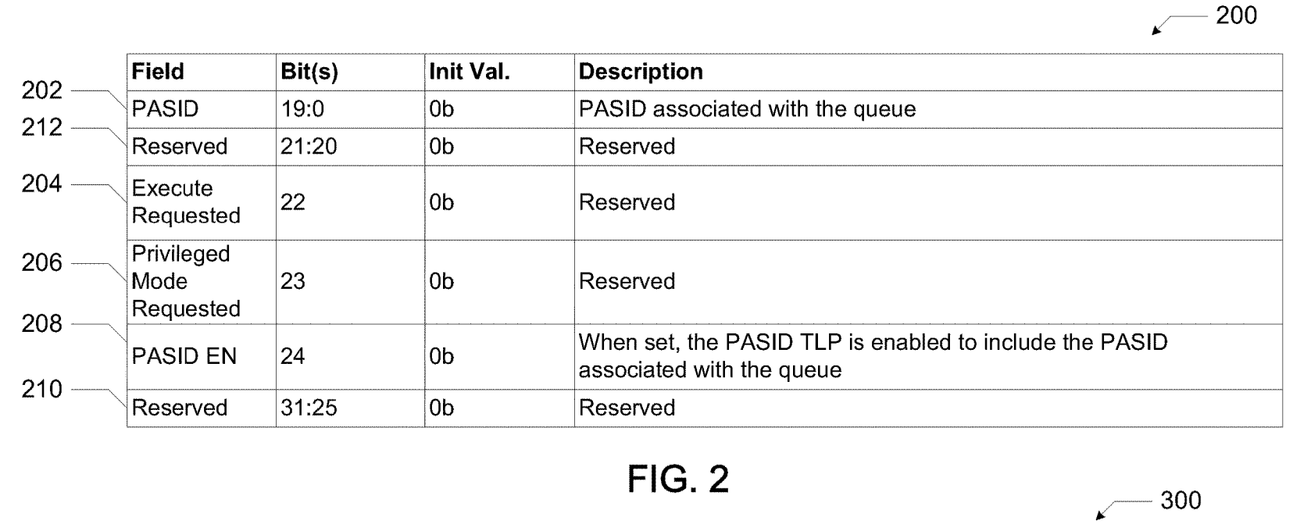
FIG. 2 depicts a per-queue Process Address Space Identifier (PASID) register, in accordance with various embodiments.

FIG. 2 depicts a per-queue Process Address Space Identifier (PASID) register 200, in accordance with various embodiments. The per-queue PASID register 200 may be associated with a particular queue of a hardware device 184 (e.g., any of the queues of the queue pairs 126, 128, 130, and 132). The per-queue PASID register 200 may include a PASID field 202, an Execute Requested field 204, a Privileged Mode Requested field 206, a PASID Enable (EN) field 208, and two Reserved fields 210 and 212. The PASID field 202 may be used to store a PASID associated with the queue (e.g., as provided by the host device 182 to the hardware device 184 when assigning a queue to an instance). The PASID EN field 208 may serve as the per-queue PASID enable indicator discussed elsewhere herein (e.g., with reference to FIG. 7 below). This field may also be referred to as PASID_EN[n], where n is an index of the queue pair within the hardware device 184. The PASID EN field 208 may be a single bit that, when set, indicates that the hardware device 184 is allowed to generate a TLP that includes the PASID in the PASID field 202. The hardware device 184 may only be able to use the PASID value stored in the PASID field 202 if the bit of the PASID EN field 208 is set. The Reserved fields 210 and 212 may be reserved for a future purpose. The Execute Requested field 204 indicates whether code may be executed in an implied range of memory. The Privileged Mode Requested field 206 may be used to qualify the bit stored in the Execute Requested field 204.

Although particular example numbers of bits for each field, and particular initial values for each field, are shown in FIG. 2, these are simply examples and any suitable number of bits or initial values may be used. Additionally, a per-queue PASID register may take an entirely different form than the example given in FIG. 2 (e.g., omitting the Execute Requested field 204, the Privileged Mode Requested field 206, and the two Reserved fields 210 and 212 and optionally replacing one or more of those fields with other fields).

In some embodiments in which the host device 182 includes logic to cause storage of the PASID in per-queue PASID registers of a hardware device 184, the host device 182 may include logic to set a PASID enable indicator of the per-queue PASID registers to enable the hardware device 184 to include the PASID of the queue pair in a TLP.

In some embodiments, the host device 182 may include logic to associate a PASID with an individual queue pair by utilizing a create Input/Output (I/O) submission queue command of a driver of the hardware device 184. The create I/O submission queue command may be included in the driver, and may be particular to the hardware device 184 (e.g., provided by the manufacturer of the hardware device 184). The host device 182 may utilize the create I/O submission queue command to specify the PASID for a submission queue of a target queue pair. In some embodiments, the host device 182 may include logic to associate a PASID with an individual queue pair by utilizing a create I/O completion queue command of a driver of the hardware device 184. The create I/O completion queue command may be included in the driver, and may be particular to the hardware device 184 (e.g., provided by the manufacturer of the hardware device 184). The host device 182 may utilize the create I/O completion queue command to specify the PASID for a completion queue of a target queue pair.

In some embodiments, the host device 182 may include logic to identify a target queue pair for assignment to a particular instance by scanning a pool of queue pairs. The target queue pair identified may be a queue pair that is currently unused (e.g., unassigned to an instance). For example, if a resource of the NVMe controller 124 is requested by Instance X, the host device 182 (e.g., the privileged agent 102) may review the pool of queue pairs 120 of the NVMe controller 124, determine that a particular queue pair is unused (e.g., the queue pair 130), and assign the queue pair to Instance X (e.g., by providing PASID X for storage in the pair of per-queue PASID registers 138 corresponding to the queue pair 130).

Figure 3:
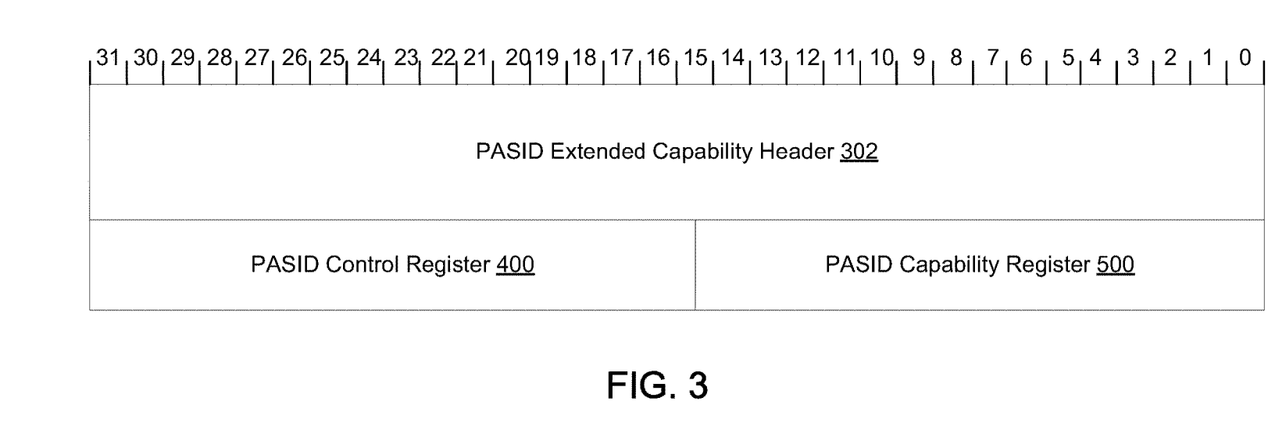
FIG. 3 depicts a PASID Extended Capability structure that may be used to enable PASID capability for allocation of queues in a hardware device, in accordance with various embodiments.

In some embodiments, the host device 182 may include logic to enable support for PASID operations of a hardware device 184. For example, the host device 182 may set a PASID Extended Capability indicator of a PASID Capability register. FIG. 3 depicts a PASID Extended Capability structure 300 that may be used to enable PASID capability for allocation of queues in a hardware device 184, in accordance with various embodiments. The PASID Extended Capability structure 300 may include a PASID Extended Capability Header 302, a PASID Control register 400, and a PASID Capability register 500. The PASID Extended Capability structure may be a structure specified in the PCI Express specification, but its use as disclosed herein for supporting I/O computing resource isolation is not. The PASID Extended Capability structure may be included in the hardware device 184.

Figure 4:
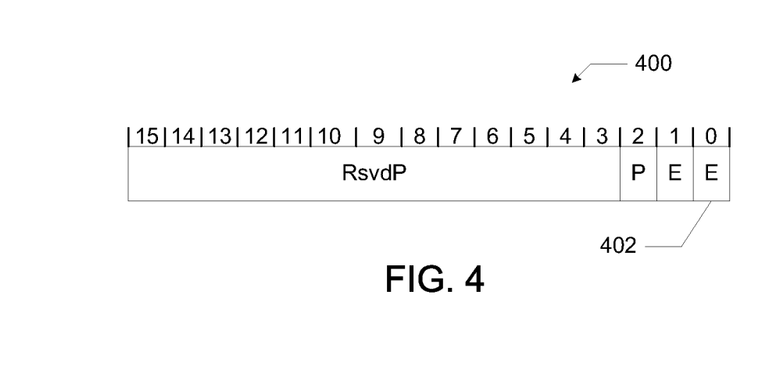
FIG. 4 depicts a PASID Control register that may be used to support PASID capability for allocation of queues in a hardware device, in accordance with various embodiments.

FIG. 4 depicts the PASID Control register 400, which may be used to support PASID capability for allocation of queues in a hardware device 184, in accordance with various embodiments. In particular, the global PASID Enabled (E) field 402 of the PASID Control register 400 may be set, by the host device 182, to allow the host device 182 (e.g., the privileged agent 102) to enable PASID extension. If a hardware device 184 supports PASID, this capability may be advertised in the PASID Extended Capability structure 300, but the capability may only be enabled upon setting the global PASID Enabled field 402.

In some embodiments, the global PASID Enabled (E) field 402 may serve as a global PASID Enable (PASID_EN) bit, as discussed below with reference to FIG. 7. The remaining fields of the PASID Control register 400 may be used as specified in the PCI Express specification. The PASID Control register 400 may be read-only.

Figure 5:
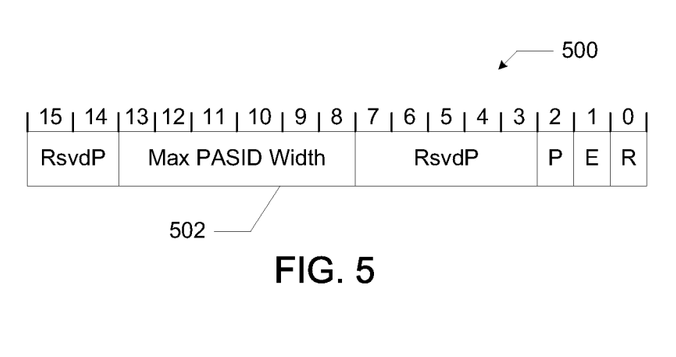
FIG. 5 depicts a PASID Capability register that may be used to support PASID capability for allocation of queues in a hardware device, in accordance with various embodiments.

FIG. 5 depicts the PASID Capability register 500, which may be used to support PASID capability for allocation of queues in a hardware device 184, in accordance with various embodiments. In particular, the Max PASID Width field 502 of the PASID Capability register 500 may be set, by the host device 182, to a value M such that $2^M$ is greater than or equal to the number of queues of the hardware device 184 (so that each queue may be associated with a unique PASID, if desired). The remaining fields of the PASID Capability register 500 may be used as specified in the PCI Express specification. The PASID Capability register 500 may be read-only from the perspective of software, but may be set by the hardware device 184.

In some embodiments, an instance running on the host device 182 may not have access to its PASID (or to an identifier of the queue pair owned by the instance). Instead, the host device 182 (e.g., the privileged agent 102) may provide, to the instance, a different handler of a queue pair assigned to the instance. This handler may be used by the instance when utilizing the queue pair.

A hardware device 184 may include logic configured to utilize the PASID associated with a queue pair for performing I/O operations using the queue pair. In some embodiments, a hardware device 184 (e.g., the NIC 122 and/or the NVMe controller 124) may include logic to identify a PASID associated with a queue pair of the hardware device 184, wherein the PASID is a PASID of an instance of the host device 182; generate a TLP including the PASID; and provide the TLP to the host device as part of a DMA transaction for the process or container. Each queue pair may be relevant to a particular DMA descriptor ring, and thus, in some embodiments, each DMA descriptor ring may be viewed as an I/O resource portion being used separately.

The logic of the hardware device 184 may be configured to receive the PASID from the host device 182 as part of identification of the PASID. In some embodiments, the PASID may be provided to the hardware device 184 by the privileged agent 102 (e.g., via the communication pathway 114 or 116 for the NIC 122 or the NVMe controller 124, respectively). For example, the PASID may be received via a create I/O submission queue command or a create I/O completion queue command of a driver of the hardware device 184.

The logic of the hardware device 184 may be configured to store the PASID in per-queue registers associated with the queue pair, as part of identification of the PASID. The storage of PASIDs in per-queue PASID registers may take any of the forms discussed above with reference to the host device 182. In some embodiments, per-queue registers may not be used, and instead, a global PASID table may be maintained, with each entry identifying all of the queue identifiers that "share" a common PASID.

Figure 6:
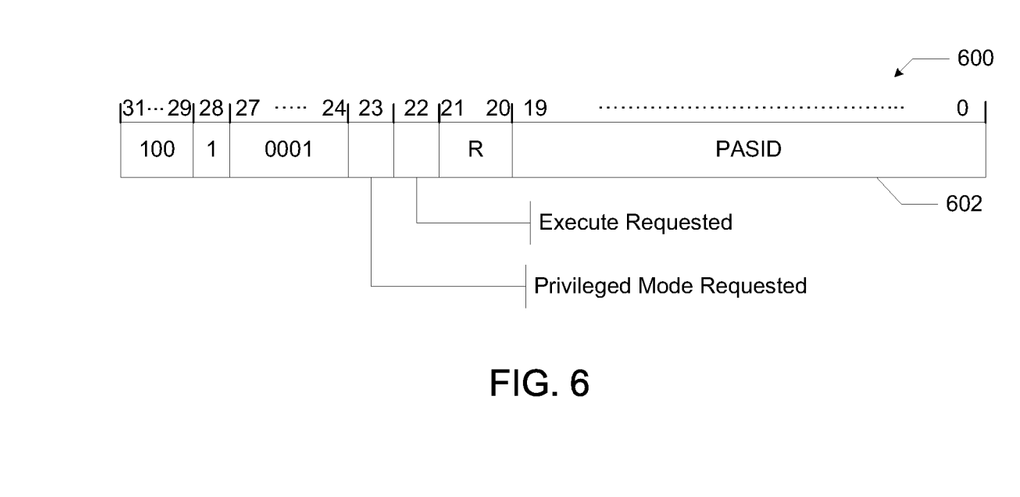
FIG. 6 depicts a Transaction Layer Packet (TLP) prefix that may be used for isolating I/O resources, in accordance with various embodiments.

In some embodiments, a PASID may be included in a TLP in a prefix of the TLP. For example, FIG. 6 depicts a TLP prefix 600 that may include a PASID and may be used for isolating I/O resources, in accordance with various embodiments. In particular, the PASID of the instance associated with the DMA transaction may be included in the PASID field 602 of the TLP prefix 600. The structure of the TLP prefix 600 may be a structure specified in the PCI Express specification, but its use as disclosed herein for supporting I/O computing resource isolation is not.

A DMA transaction from a hardware device 184 may be received by the system agent and root complex 108, and may be processed at the host device 182 by the IOMMU 110. For example, as shown in FIG. 1, the NIC 122 may provide a DMA transaction to the host device 182 via the communication pathway 144 and the NVMe controller 124 may provide the DMA transaction to the host device 182 via the communication pathway 146.

The host device 182 may use the PASID included in the TLP of a DMA transaction to determine a location of a first-level paging table for the instance associated with the PASID. This may take the form of the process discussed above with reference to the root table 150, the context table 154, the PASID table 158, and the first-level paging structures 164 and 166.

The TLP of the DMA transaction may include an identifier of the instance associated with the PASID. The identifier may be different from the PASID. For example, in some embodiments, the identifier of the instance may be an Alternative Routing Identifier.

The DMA transaction may be associated with a DMA region of a DRAM 168 of the host device 182. This DMA region may be assigned to the instance corresponding to the PASID in the TLP. For example, FIG. 1 depicts a DMA region 178 assigned to Instance X, and a DMA region 180 assigned to Instance Y. Within the DMA regions assigned to a particular instance, sub-regions may be assigned to hardware device resources that are assigned to the same instance. For example, FIG. 1 depicts a DMA region 170 associated with the resources of the NIC 122 that are assigned to Instance X, and a DMA region 172 associated with the resources of the NVMe controller 124 assigned to Instance X. FIG. 1 also depicts a DMA region 174 associated with the resources of the NIC 122 that are assigned to Instance Y, and a DMA region 176 associated with the resources of the NVMe controller 124 assigned to Instance Y. The DMA region associated with a particular DMA transaction may be accessed by the IMC 188.

In some embodiments, a hardware device 184 may include logic to determine that its PASID capabilities are enabled before performing further PASID-related operations. For example, the hardware device 184 may determine that a PASID Extended Capability indicator of a PASID Capability Register is set prior to proceeding with further PASID-related operations. In some embodiments, the hardware device 184 may also or alternatively determine that a PASID enable indicator of per-queue PASID registers associated with a particular queue pair is set before proceeding with further PASID-related operations.

During a DMA transaction, the IOMMU 110 may receive an identifier of the requesting instance from the TLP (e.g., an Alternative Routing Identifier) to index an extended-context-entry (associated with a domain), as discussed above with reference to the context table 154. The extended-context-entry may provide a base point to a PASID table of that domain, as discussed above with reference to the PASID table 158. The IOMMU 110 may take the PASID value from the PASID TLP prefix as an offset to identify the PASID entry that points to the first-level paging table for the instance of the PASID. These operations secure different instances from each other.

Figure 7:
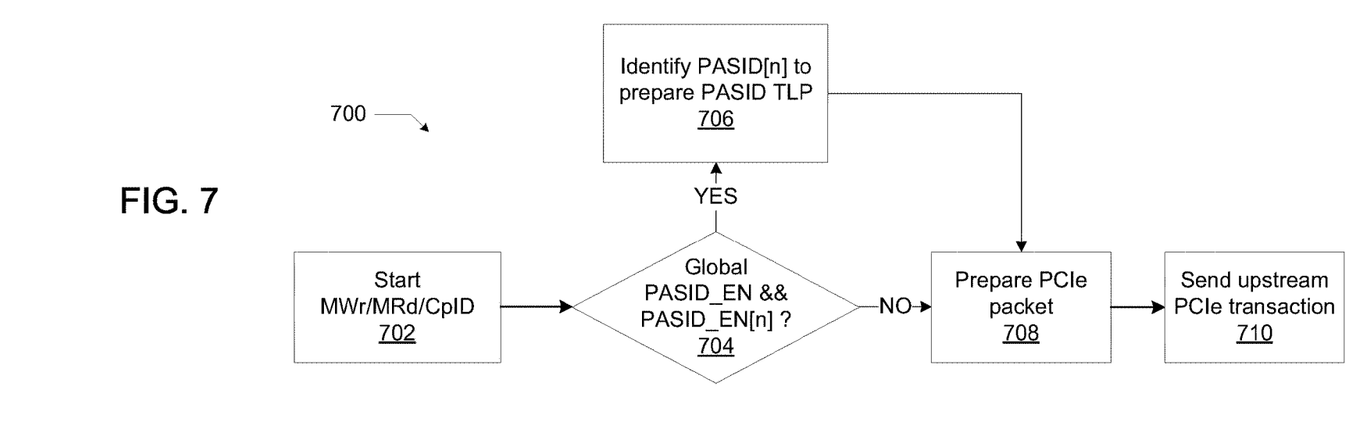
FIG. 7 is a flow diagram of a method for providing a TLP to a host device as part of a Direct Memory Access (DMA) transaction for a process or container, in accordance with various embodiments.

FIG. 7 is a flow diagram of a method 700 for providing a TLP to the host device 182 as part of a DMA transaction for a process or container, in accordance with various embodiments. The method 700 may be performed by a hardware device 184 (e.g., the NIC 122 and/or the NVMe controller 124). To illustrate various operations of the method 700, the NIC 122 and its queue pair 128 may be used as an example, but this is simply for illustrative purposes and any hardware device 184 (e.g., the NVMe controller 124) and any queue pair (e.g., the queue pair 126) may be used in performing the method 700. Additionally, although the operations of the method 700 (and the other methods disclosed herein) may be illustrated and discussed in a particular order, the operations may be performed in any suitable order, in parallel, or in any suitable combination.

At 702, the hardware device 184 may start a Memory Write Request (MWr), Memory Read Request (MRd), or a Completion with Data (CpID) on a particular DMA descriptor ring associated with a particular queue pair. For example, the NIC 122 may start an MWr, MRd, or CpID on a DMA descriptor ring associated with the queue pair 128.

At 704, the hardware device 184 may determine whether a global PASID Enable bit (PASID_EN) and a PASID Enable bit for the particular queue pair (PASID_EN[n], where n is an index of the queue pair) are set. In some embodiments, the PASID_EN bit may be the PASID Enabled (E) field 402 of the PASID Control Register 400. In some embodiments, the PASID_EN[n] (also referred to as a per-queue PASID enable indicator) may be the PASID EN field 208 of the per-queue PASID register 200 for the queue pair n. For example, the NIC 122 may determine whether the PASID_EN bit is set (governing PASID capability for all of the queue pairs 118) and whether the PASID_EN[1] is set (governing the queue pair 128).

If the hardware device 184 determines at 704 that the PASID_EN bit and the PASID_EN[n] bit are set, the hardware device 184 may proceed to 706 and identify the PASID associated with the queue pair n (referred to herein as "PASID[n]") and may prepare a PASID TLP. In some embodiments, the hardware device 184 may identify the PASID associated with a queue pair from a per-queue PASID register having the form of the per-queue PASID register 200 (e.g., in the PASID field 202). In some embodiments, the hardware device may prepare a PASID TLP as discussed above with reference to FIG. 6. For example, the NIC 122 may prepare a PASID TLP including PASID X from the per-queue PASID register 136 of the queue pair 128. If the hardware device 184 determines at 704 that the PASID_EN bit or the PASID_EN[n] bit is not set, the hardware device 184 may proceed to 708.

At 708, the hardware device 184 may prepare a PCIe packet. If the hardware device 184 prepared a PASID TLP at 706, the PCIe packet prepared at 708 may include the PASID TLP of 706, and the hardware device may then proceed to 710 to send an upstream DMA transaction to the host device 182. For example, the NIC 122 may encapsulate a PCIe packet with the PASID TLP (including the PASID X associated with the queue pair 128) and may send a corresponding upstream DMA transaction to the system agent and root complex 108 of the host device 182. If the hardware device 184 did not prepare a PASID TLP (e.g., because the hardware device 184 determined that the PASID_EN bit or the PASID_EN[n] bit is not set), the hardware device 184 may prepare a PCIe packet using the conventional approach, and then proceed to 710 to send an upstream DMA transaction to the host device 182. The method 700 may then end.

Figure 8:
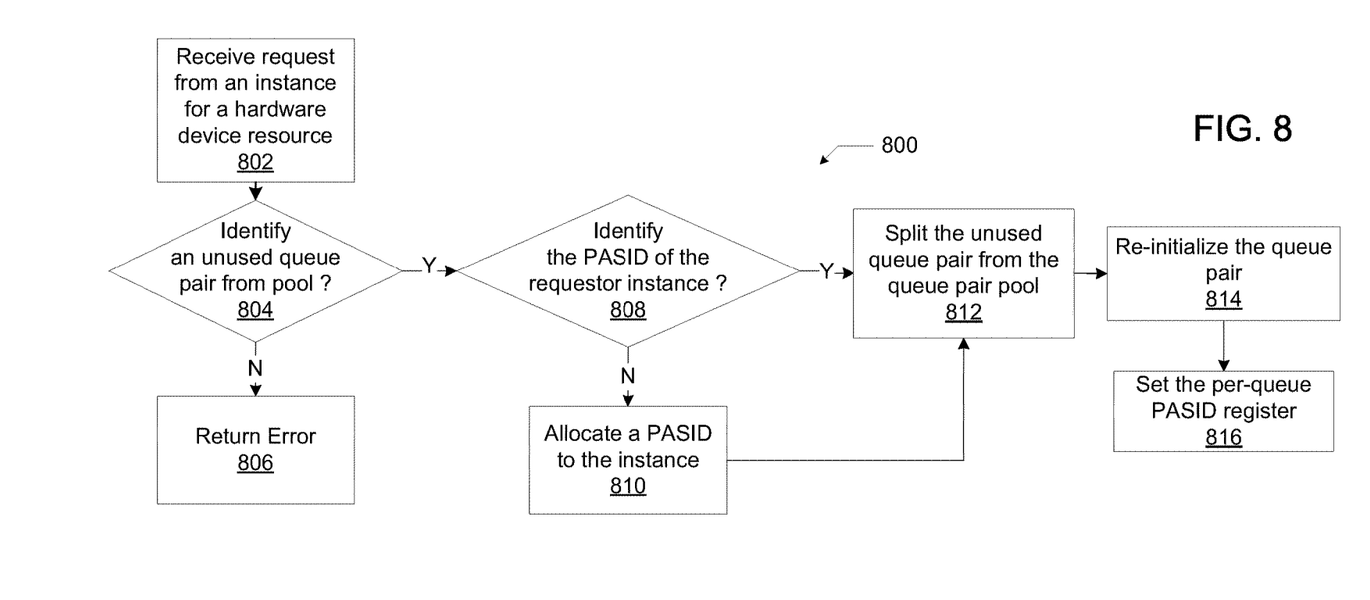
FIG. 8 is a flow diagram of a method for performing secure Input/Output (I/O) partitioning, in accordance with various embodiments.

FIG. 8 is a flow diagram of a method 800 for performing secure I/O partitioning, in accordance with various embodiments. The method 800 may be performed by the host device 182 (e.g., the privileged agent 102).

At 802, the host device 182 may receive a request from an instance running on the host device 182 for a resource of a hardware device 184 (e.g., the NIC 122 or the NVMe controller 124).

At 804, the host device 182 may determine whether an unused queue pair from a pool of queue pairs associated with the requested hardware device 184 can be identified. If no unused queue pair can be identified (e.g., all queue pairs for the requested hardware device 184 are assigned to other instances), the host device 182 may proceed to 806 and return an error.

If the host device 182 determines at 804 that an unused queue pair from the pool of queue pairs of the requested hardware device 184 can be identified, the host device 182 may proceed to 808 and determine whether a PASID of the instance (stored in the privileged agent 102) can be identified.

If the host device 182 determines at 808 that no PASID of the instance can be identified, the host device 182 may proceed to 810 and may allocate a PASID to the instance (e.g., using any conventional ID allocation techniques). The host device may then proceed to 812.

If the host device 182 determines at 808 that a PASID of the instance can be identified, the host device 182 may proceed to 812 and may split the unused queue pair from the queue pair pool (e.g., as part of a software cleanup procedure).

At 814, the host device 182 may re-initialize the queue pair (e.g., by resetting the queue pair).

At 816, the host device 182 may set the per-queue PASID register associated with the unused queue pair to assign the queue pair to the instance. For example, the host device 182 may set the PASID_EN[n] bit associated with the queue pair, and may provide the PASID of the instance to the hardware device 184 to store in a per-queue PASID register associated with the queue pair. The method 800 may then end.

Figure 9:
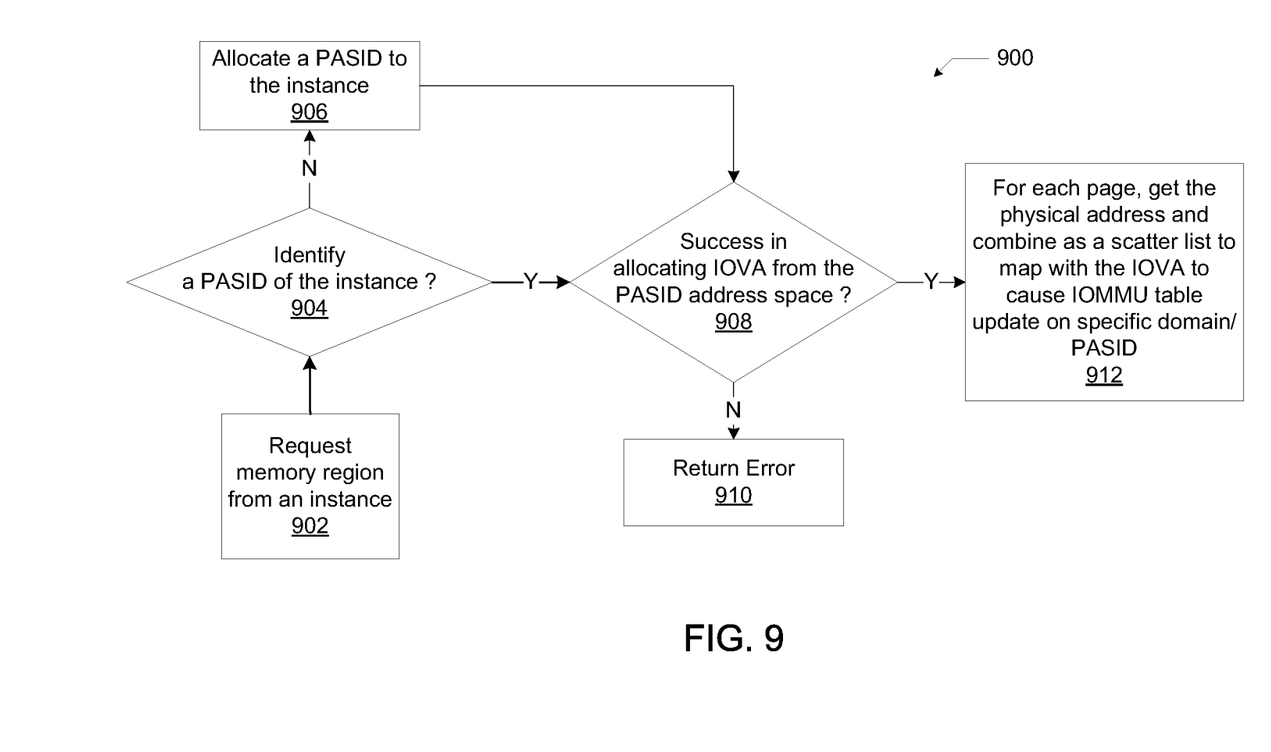
FIG. 9 is a flow diagram of a method for registering memory to an instance, in accordance with various embodiments.

FIG. 9 is a flow diagram of a method 900 for registering memory to an instance, in accordance with various embodiments. The result of the method 900 may be the registration of an isolation region of IOVA which can only be used by the instance. Thus, even within a domain of the IOMMU 110 (associated with a particular hardware device 184, such as a PCIe hardware device), the queue pairs assigned to difference instances may have an absolute and independent IOVA space. The method 900 may be performed by the host device 182.

At 902, the host device 182 may receive a request for a memory region from an instance.

At 904, the host device 182 may determine whether a PASID for the instance can be identified. This determination may be performed in accordance with any of the embodiments of 808 discussed above with reference to FIG. 8, for example.

If the host device 182 determines at 904 that no PASID of the instance can be identified, the host device 182 may proceed to 906 and may allocate a PASID to the instance. This allocation may be performed in accordance with any of the embodiments of 810 discussed above with reference to FIG. 8, for example. The host device may then proceed to 908.

If the host device 182 determines at 904 that a PASID of the instance can be identified, the host device 182 may proceed to 908 and may determine whether allocation of Input/Output Virtual Addresses (IOVA) from the PASID address space to the instance was successful. In some embodiments, the privileged agent 102 (e.g., running inside the kernel of the host device 182) may allocate linear IOVA from the PASID address space. If the host device 182 determines at 908 that the allocation was not successful, the host device 182 may proceed to 910 and return an error.

If the host device 182 determines at 908 that the allocation was successful, the host device 182 may proceed to 912 and may, for each page, identify the physical address and combine as a scatter list to map with the IOVA to cause an IOMMU table update on the specific PASID. In particular, the host device 182 may identify the number of pages with contiguous IOVA, and then kernel allocate the same number of physical pages (which may be not contiguous). The physical pages may be combined as a scatter page list, with each page from the scatter page list mapping to a IOVA page. The mapping may be performed by the page table of the IOMMU 110, resulting in an IOMMU table update for the specific PASID. The method 900 may then end.

Figure 10:
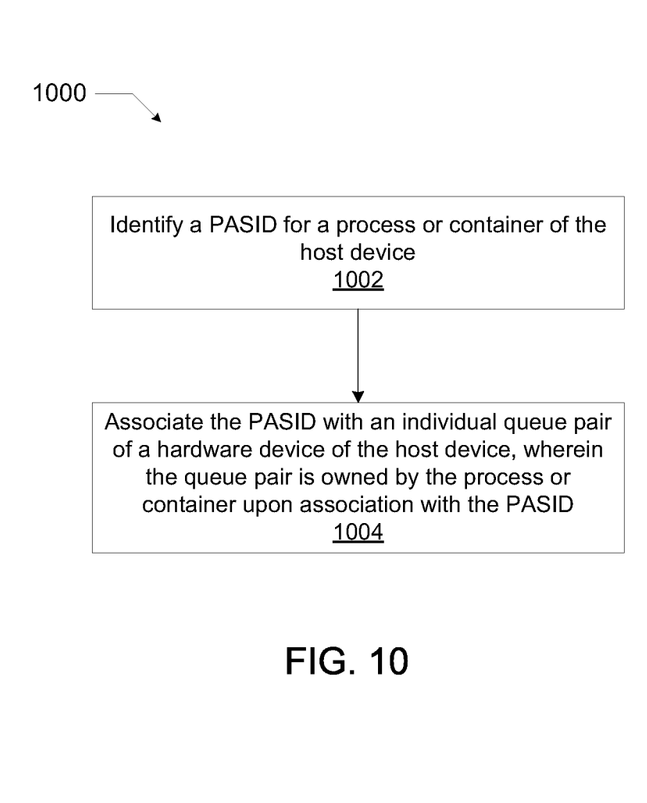
FIG. 10 is a flow diagram of a method for utilizing resources of a hardware device of a host device, in accordance with various embodiments.

FIG. 10 is a flow diagram of a method 1000 for utilizing resources of a hardware device 184 of a host device 182, in accordance with various embodiments. The method 1000 may be performed by the host device 182 (e.g., the privileged agent 102). To illustrate various operations of the method 1000, utilizing resources of the NIC 122 and its queue pair 128 may be used as an example, but this is simply for illustrative purposes and any hardware device 184 (e.g., the NVMe controller 124) and any queue pair (e.g., the queue pair 126) may be the subject of the method 1000.

At 1002, the host device 182 may identify a PASID for a process or container on the host device 182. For example, the host device 182 may identify PASID X as the PASID associated with Instance X. In some embodiments, the process or container is assigned to a proper subset of a total number of processing cores included in the host device 182.

At 1004, the host device 182 may associate the PASID with an individual queue pair of a hardware device 184 of the host device 182. The queue pair is owned by the process or container upon association with the PASID. For example, the host device 182 may associate PASID X with the queue pair 128 of the NIC 122 to assign the queue pair 128 to Instance X. In some embodiments, 1004 may include identifying the queue pair as an unused queue pair from a pool of queue pairs. In some embodiments, 1004 may include utilizing a create I/O submission queue command or a create I/O completion queue command of a driver of the hardware device 184.

In some embodiments, 1004 may include causing storage of the PASID associated with the queue pair in per-queue PASID registers of the hardware device 184 (e.g., the per-queue PASID registers 136 associated with the queue pair 128). In some such embodiments, the method 1004 may further include setting, by the host device 182, a PASID enable indicator of the per-queue PASID registers to enable the hardware device 184 to include the PASID of the queue pair in a Transaction Layer Packet (TLP).

In some embodiments, the method 1000 may further include providing a handler of the queue pair to the process or container, wherein the handler is not the PASID.

In some embodiments, the method 1000 may further include enabling, by the host device 182, support for PASID operations of the hardware device 184. In some such embodiments, enabling support for PASID operations of the hardware device 184 may include setting a PASID Extended Capability indicator of a PASID Capability Register 500.

Figure 11:
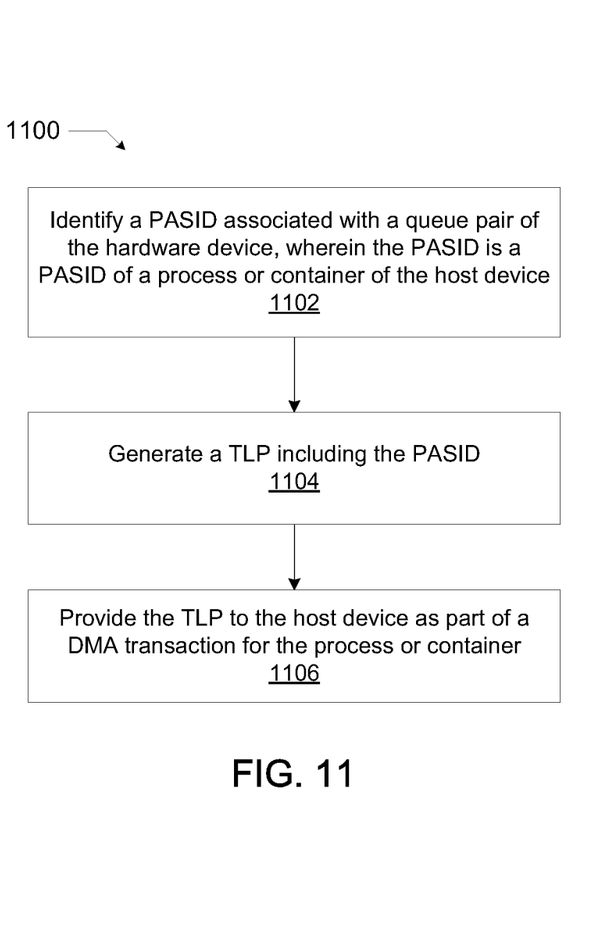
FIG. 11 is a flow diagram of a method for utilizing resources of a hardware device of a host device, in accordance with various embodiments.

FIG. 11 is a flow diagram of a method 1100 for utilizing resources of a hardware device 184 of a host device 182, in accordance with various embodiments. The method 1100 may be performed by a hardware device 184 (e.g., the NIC 122 or the NVMe controller 124).

At 1102, the hardware device 184 may identify a PASID associated with a queue pair of the hardware device 184. The PASID is a PASID of a process or container of the host device 182.

At 1104, the hardware device 184 may generate a TLP including the PASID.

At 1106, the hardware device 184 may provide the TLP to the host device 182 as part of a DMA transaction for the process or container. The method 1100 may then end.

In some embodiments, the method 1100 may further include, prior to 1102, determining, by the hardware device 184, that a PASID Extended Capability indicator of a PASID Capability Register 500 is set, and determining, by the hardware device 184, that a PASID enable indicator of per-queue PASID registers associated with the queue pair is set.

In some embodiments of the method 1100, the host device 182 is to use the PASID to determine a location of a first-level paging table for the process or container.

In some embodiments of the method 1100, the DMA transaction is associated with a DMA region assigned to the process or container of the host device 182 in a DRAM 168 of the host device 182.

In some embodiments, 1102 may include receiving the PASID from the host device 182. In some embodiments, 1102 may include storing the PASID in per-queue registers associated with the queue pair.

In some embodiments of the method 1100, the hardware device 184 is a PCIe device.

In some embodiments of the method 1100, the DMA transaction is processed at the host device by the IOMMU 110 of the host device 182.

In some embodiments of the method 1100, the TLP includes an identifier of a process or container assigned to the queue pair, wherein the identifier is different from the PASID. For example, the identifier of the process or container may be an Alternative Routing Identifier.

The following paragraphs describe examples of various ones of the embodiments disclosed herein.

Example 1 is one or more computer readable media having instructions thereon that, in response to execution by one or more processing devices of a host device, cause the host device to: identify a Process Address Space Identifier (PASID) for a process or container of the host device; and associate the PASID with an individual queue pair of a hardware device of the host device, wherein the queue pair includes two complementary queues and wherein the queue pair is owned by the process or container upon association with the PASID.

Example 2 may include the subject matter of Example 1, and may further specify that the instructions cause the host device to, as part of association of the PASID with an individual queue pair, cause storage of the PASID for associated with the queue pair in per-queue PASID registers of the hardware device.

Example 3 may include the subject matter of Example 2, and may further specify that the instructions cause the host device to, as part of association of the PASID for with an individual queue pair, identify the queue pair as an unused queue pair from a pool of queue pairs.

Example 4 may include the subject matter of any of Examples 2-3, and may further specify that the instructions further cause the host device to set a PASID enable indicator of the per-queue PASID registers to enable the hardware device to include the PASID of the queue pair in a Transaction Layer Packet (TLP).

Example 5 may include the subject matter of any of Examples 1-4, and may further specify that the instructions cause the host device to, as part of association of the PASID with an individual queue pair, utilize a create Input/Output (I/O) submission queue command of a driver of the hardware device.

Example 6 may include the subject matter of Example 5, and may further specify that the instructions cause the host device to, as part of association of the PASID with an individual queue pair, utilize a create I/O completion queue command of the driver of the hardware device.

Example 7 may include the subject matter of any of Examples 1-6, and may further specify that the instructions further cause the host device to provide a handler of the queue pair to the process or container, wherein the handler is not the PASID.

Example 8 may include the subject matter of any of Examples 1-7, and may further specify that the instructions further cause the host device to enable support for PASID operations of the hardware device.

Example 9 may include the subject matter of Example 8, and may further specify that the instructions cause the host device to, as part of enablement of support for PASID operations of the hardware device, set a PASID Extended Capability indicator of a PASID Capability Register.

Example 10 may include the subject matter of any of Examples 1-9, and may further specify that the process or container is assigned to a proper subset of a total number of processing cores included in the host device.

Example 11 is one or more computer readable media having instructions thereon that, in response to execution by one or more processing devices of a hardware device of a host device, cause the hardware device to: identify a Process Address Space Identifier (PASID) associated with a queue pair of the hardware device, wherein the queue pair includes two complementary queues and wherein the PASID is a PASID of a process or container of the host device; generate a Transaction Layer Packet (TLP) including the PASID; and provide the TLP to the host device as part of a Direct Memory Access (DMA) transaction for the process or container.

Example 12 may include the subject matter of Example 11, and may further specify that the instructions are further to cause the hardware device to, prior to identification of the PASID associated with the queue pair, determine that a PASID Extended Capability indicator of a PASID Capability Register is set, and determine that a PASID enable indicator of per-queue PASID registers associated with the queue pair is set.

Example 13 may include the subject matter of any of Examples 11-12, and may further specify that the host device is to use the PASID to determine a location of a first-level paging table for the process or container.

Example 14 may include the subject matter of Example 13, and may further specify that the DMA transaction is associated with a DMA region assigned to the process or container of the host device in a Dynamic Random Access Memory (DRAM) of the host device.

Example 15 may include the subject matter of any of Examples 11-14, and may further specify that the instructions are to cause the hardware device to, as part of identification of the PASID associated with the queue pair, receive the PASID from the host device.

Example 16 may include the subject matter of Example 15, and may further specify that the instructions are to cause the hardware device to, as part of identification of the PASID associated with the queue pair, store the PASID in per-queue registers associated with the queue pair.

Example 17 may include the subject matter of any of Examples 11-16, and may further specify that the hardware device is a Peripheral Component Interconnect Extended (PCIe) device.

Example 18 may include the subject matter of Example 17, and may further specify that the hardware device is a Network Interface Controller (NIC) or a Non-Volatile Memory Express (NVMe) controller.

Example 19 may include the subject matter of any of Examples 11-18, and may further specify that the DMA transaction is processed at the host device by an Input/Output Memory Management Unit (IOMMU) of the host device.

Example 20 may include the subject matter of any of Examples 11-19, and may further specify that the TLP includes an identifier of a process or container assigned to the queue pair, wherein the identifier is different from the PASID.

Example 21 may include the subject matter of Example 20, and may further specify that the identifier of the process or container is an Alternative Routing Identifier.

Example 22 is a method for utilizing resources of a hardware device of a host device, including: identifying, by the host device, a Process Address Space Identifier (PASID) for a process or container of the host device; and associating the PASID with an individual queue pair of a hardware device of the host device, wherein the queue pair includes two complementary queues, and wherein the queue pair is owned by the process or container upon association with the PASID.

Example 23 may include the subject matter of Example 22, and may include, as part of associating the PASID with an individual queue pair, causing storage of the PASID associated with the queue pair in per-queue PASID registers of the hardware device.

Example 24 may include the subject matter of Example 23, and may include, as part of associating the PASID with the individual queue pair, identifying the queue pair as an unused queue pair from a pool of queue pairs.

Example 25 may include the subject matter of any of Examples 23-24, and may include setting, by the host device, a PASID enable indicator of the per-queue PASID registers to enable the hardware device to include the PASID of the queue pair in a Transaction Layer Packet (TLP).

Example 26 may include the subject matter of any of Examples 22-25, and may include, as part of associating the PASID with the individual queue pair, utilizing a create Input/Output (I/O) submission queue command of a driver of the hardware device.

Example 27 may include the subject matter of Example 26, and may include, as part of associating the PASID with the individual queue pair, utilizing a create I/O completion queue command of the driver of the hardware device.

Example 28 may include the subject matter of any of Examples 22-27, and may include providing a handler of the queue pair to the process or container, wherein the handler is not the PASID.

Example 29 may include the subject matter of any of Examples 22-28, and may include enabling, by the host device, support for PASID operations of the hardware device.

Example 30 may include the subject matter of Example 29, and may include, as part of enabling support for PASID operations of the hardware device, setting a PASID Extended Capability indicator of a PASID Capability Register.

Example 31 may include the subject matter of any of Examples 22-30, and may further specify that the process or container is assigned to a proper subset of a total number of processing cores included in the host device.

Example 32 is a method for utilizing resources of a hardware device of a host device, including: identifying, by the hardware device of the host device, a Process Address Space Identifier (PASID) associated with a queue pair of the hardware device, wherein the queue pair includes two complementary queues and wherein the PASID is a PASID of a process or container of the host device; generating, by the hardware device, a Transaction Layer Packet (TLP) including the PASID; and providing, by the hardware device, the TLP to the host device as part of a Direct Memory Access (DMA) transaction for the process or container.

Example 33 may include the subject matter of Example 32, and may include, prior to identifying the PASID associated with the queue pair, determining, by the hardware device, that a PASID Extended Capability indicator of a PASID Capability Register is set, and determining, by the hardware device, that a PASID enable indicator of per-queue PASID registers associated with the queue pair is set.

Example 34 may include the subject matter of any of Examples 32-33, and may further specify that the host device is to use the PASID to determine a location of a first-level paging table for the process or container.

Example 35 may include the subject matter of Example 34, and may further specify that the DMA transaction is associated with a DMA region assigned to the process or container of the host device in a Dynamic Random Access Memory (DRAM) of the host device.

Example 36 may include the subject matter of any of Examples 32-35, and may include, as part of identifying the PASID associated with the queue pair, receiving the PASID from the host device.

Example 37 may include the subject matter of Example 36, and may include, as part of identifying the PASID for the queue pair, storing the PASID in per-queue registers associated with the queue pair.

Example 38 may include the subject matter of any of Examples 32-37, and may further specify that the hardware device is a Peripheral Component Interconnect Extended (PCIe) device.

Example 39 may include the subject matter of Example 38, and may further specify that the hardware device is a Network Interface Controller (NIC) or a Non-Volatile Memory Express (NVMe) controller.

Example 40 may include the subject matter of any of Examples 32-39, and may further specify that the DMA transaction is processed at the host device by an Input/Output Memory Management Unit (IOMMU) of the host device.

Example 41 may include the subject matter of any of Examples 32-40, and may further specify that the TLP includes an identifier of a process or container assigned to the queue pair, wherein the identifier is different from the PASID.

Example 42 may include the subject matter of Example 41, and may further specify that the identifier of the process or container is an Alternative Routing Identifier.

Example 43 is a host device, including: first logic to identify a Process Address Space Identifier (PASID) for a process or container of the host device; and second logic to associate the PASID with an individual queue pair of a hardware device of the host device, wherein the queue pair includes two complementary queues and wherein the queue pair is owned by the process or container upon association with the PASID.

Example 44 may include the subject matter of Example 43, and may further specify that the first logic is to, as part of association of the PASID with an individual queue pair, cause storage of the PASID for the queue pair in per-queue PASID registers of the hardware device.

Example 45 may include the subject matter of Example 44, and may further specify that the first logic is to, as part of association of the PASID with an individual queue pair, identify of the queue pair as an unused queue pair from a pool of queue pairs.

Example 46 may include the subject matter of any of Examples 44-45, and may include third logic to set a PASID enable indicator of the per-queue PASID registers to enable the hardware device to include the PASID of the queue pair in a Transaction Layer Packet (TLP).

Example 47 may include the subject matter of any of Examples 43-46, and may further specify that the first logic is to, as part of association of the PASID with an individual queue pair, utilize a create Input/Output (I/O) submission queue command of a driver of the hardware device.

Example 48 may include the subject matter of Example 47, and may further specify that the first logic is to, as part of association of the PASID with an individual queue pair, utilize a create I/O completion queue command of the driver of the hardware device.

Example 49 may include the subject matter of any of Examples 43-48, and may include fourth logic to provide a handler of the queue pair to the process or container, wherein the handler is not the PASID.

Example 50 may include the subject matter of any of Examples 43-49, and may include fifth logic to enable support for PASID operations of the hardware device.

Example 51 may include the subject matter of Example 50, and may further specify that the fourth logic is to, as part of enablement of support for PASID operations of the hardware device, set a PASID Extended Capability indicator of a PASID Capability Register.

Example 52 may include the subject matter of any of Examples 43-51, and may further specify that the process or container is assigned to a proper subset of a total number of processing cores included in the host device.

Example 53 is a hardware device, including: first logic to identify a Process Address Space Identifier (PASID) associated with a queue pair of the hardware device, wherein the queue pair includes two complementary queues and wherein the PASID is a PASID of a process or container of the host device; second logic to generate a Transaction Layer Packet (TLP) including the PASID; and third logic to provide the TLP to a host device of the hardware device as part of a Direct Memory Access (DMA) transaction for the process or container.

Example 54 may include the subject matter of Example 53, and may include fourth logic to, prior to identification of the PASID associated with the queue pair, determine that a PASID Extended Capability indicator of a PASID Capability Register is set, and determine that a PASID enable indicator of per-queue PASID registers associated with the queue pair is set.

Example 55 may include the subject matter of any of Examples 53-54, and may further specify that the host device is to use the PASID to determine a location of a first-level paging table for the process or container.

Example 56 may include the subject matter of Example 55, and may further specify that the DMA transaction is associated with a DMA region assigned to the process or container of the host device in a Dynamic Random Access Memory (DRAM) of the host device.

Example 57 may include the subject matter of any of Examples 53-56, and may further specify that the first logic is to, as part of identification of the PASID associated with the queue pair, receive the PASID from the host device.

Example 58 may include the subject matter of Example 57, and may further specify that the first logic is to, as part of identification of the PASID associated with the queue pair, store the PASID in per-queue registers associated with the queue pair.

Example 59 may include the subject matter of any of Examples 53-58, and may further specify that the hardware device is a Peripheral Component Interconnect Extended (PCIe) device.

Example 60 may include the subject matter of Example 59, and may further specify that the hardware device is a Network Interface Controller (NIC) or a Non-Volatile Memory Express (NVMe) controller.

Example 61 may include the subject matter of any of Examples 53-60, and may further specify that the DMA transaction is processed at the host device by an Input/Output Memory Management Unit (IOMMU) of the host device.

Example 62 may include the subject matter of any of Examples 53-61, and may further specify that the TLP includes an identifier of a process or container assigned to the queue pair, wherein the identifier is different from the PASID.

Example 63 may include the subject matter of Example 62, and may further specify that the identifier of the process or container is an Alternative Routing Identifier.

Example 64 is one or more computer readable media having instructions thereon that, in response to execution by one or more processing devices of an apparatus, cause the apparatus to perform the method of any of Examples 22-42.

Example 65 is an apparatus comprising means for performing the method of any of Examples 22-42.

What is claimed is:

1. A host device for parallel computing, comprising:
a plurality of processor cores to execute a plurality of processes or containers in parallel;
first logic operated by the processor cores to identify a Process Address Space Identifier (PASID) for one of the processes or containers; and
second logic operated by the processor cores to associate the PASID with a first individual queue pair of a first plurality of queue pairs of a first input/output (I/O) hardware device communicatively coupled with the host device, and associate the PASID with a second individual queue pair of a second plurality of queue pairs of a second I/O hardware device communicatively coupled with the host device, to isolate the first individual queue pair from other ones of the first plurality of queue pairs of the first I/O hardware device and the second individual queue pair from other ones of the second plurality of queue pairs of the second I/O hardware device to form an isolated I/O hardware device partition for the process or container, with other processes or containers having respective other isolated I/O hardware device partitions having other queue pairs of the first, the second or other I/O hardware devices;
wherein each of the first and second plurality of queue pairs includes two complementary queues and wherein each of the first and second individual queue pairs is owned by the process or container upon association with the PASID of the process or container.

2. The host device of claim 1, wherein the first logic is to, as part of association of the PASID with the first and second individual queue pairs, cause storage of the PASID into first and second PASID registers of the first and second I/O hardware devices respectively associated with the first and second individual queue pairs.

3. The host device of claim 2, wherein the first logic is to, as part of association of the PASID with the first and second individual queue pairs, respective identify the first and second individual queue pairs as unused queue pairs from a first and a second pool of queue pairs of the first and second I/O hardware devices.

4. The host device of claim 2, further comprising:
third logic operated by the processor cores to respectively set a first and a second PASID enable indicator of the first and second PASID registers to enable the first and second I/O hardware devices to include the associated PASID of the first and second queue pairs in Transaction Layer Packets (TLPs).

5. The host device claim 1, wherein the first logic is to, as part of association of the PASID with the first and second individual queue pairs, utilize a create Input/Output (I/O) submission queue command of a driver with at least one of the first or the second I/O hardware device.

6. The host device of claim 5, wherein the first logic is to, as part of association of the PASID with the first and second individual queue pairs, utilize a create I/O completion queue command of the driver of the at least one of the first or the second I/O hardware device.

7. The host device of claim 1, further comprising:
fourth logic operated by the processor cores to provide a first and a second handler of the first and second individual queue pairs to the process or container, wherein the first and second handlers are not the PASID.

8. The host device of claim 1, further comprising:
fifth logic operated by the processor cores to enable support for PASID operations of the first and second I/O hardware devices.

9. A first input/output (I/O) hardware device, comprising:
one or more processors;
a first collection of queue pairs, each queue pair having two complementary queues;
first logic operated by the one or more processors to identify a Process Address Space Identifier (PASID) associated with a first of the first collection of queue pairs, wherein the PASID is a PASID of a process or container executed by a host device communicatively coupled with the first and a second I/O hardware device, the second I/O hardware device having a second of a second collection of queue pairs associated with the PASID to join the first queue pair as part of an I/O hardware device partition isolated for the execution of the process or container by the host device in parallel with other processes or containers having respective other isolated I/O hardware device partitions having other queue pairs of the first, the second or other I/O hardware devices;
second logic operated by the one or more processors to generate a Transaction Layer Packet (TLP) including the PASID; and
third logic operated by the one or more processors to provide the TLP to the host device as part of a Direct Memory Access (DMA) transaction for the process or container.

10. The first I/O hardware device of claim 9, further comprising:
a PASID Capability Register;
a first plurality of PASID registers respectively associated with the first collection of queue pairs; and
fourth logic operated by the one or more processors to, prior to identification of the PASID as associated with the first queue pair, determine that a PASID Extended Capability indicator of the PASID Capability Register is set, and determine that a PASID enable indicator of a first of the first plurality of PASID registers associated with the first queue pair is set.

11. The first I/O hardware device of claim 9, wherein the host device is to use the PASID to determine a location of a first-level paging table for the process or container.

12. The hardware device of claim 11, wherein the DMA transaction is associated with a DMA region assigned to the process or container in a Dynamic Random Access Memory (DRAM) of the host device.

13. The hardware device of claim 9, wherein the first logic is to, as part of identification of the PASID associated with the first queue pair, receive the PASID from the host device.

14. A method for utilizing resources of a first and a second input/output (I/O) hardware device communicatively coupled with a host device, comprising:
receiving, by the first and second I/O hardware devices, from the host device, a Process Address Space Identifier (PASID) for a process or container being executed by the host device in parallel with other processes or containers being executed by the host device; and
respectively associating, by the first and second I/O hardware device, the PASID with a first individual queue pair of a first plurality of queue pairs of the first I/O hardware device and a second individual queue pair of a second plurality of queue pairs of the second I/O hardware device, wherein each of the first and the second queue pair includes two complementary queues, and wherein the first and second queue pairs are owned by the process or container upon association with the PASID, and are part of an I/O partition associated with the process or container;
wherein other individual queue pairs of the first and second plurality of queue pairs of the first and second I/O hardware devices are selectively associated with the other processes or containers executed in parallel via their respective PASIDs to form respective I/O partitions for the other processes or containers being executed in parallel.

15. The method of claim 14, comprising, as part of associating the PASID of the process or container with the first and second individual queue pairs, causing storage of the PASID of the process or container into respective first and second PASID registers of the first and second I/O hardware devices respectively associated with the first and second queue pairs.

16. The method of claim 14, further comprising:
enabling or causing to be enabled, by the first and second I/O hardware devices, support for PASID operations of the first and second I/O hardware device.

17. The method of claim 16, comprising, as part of enabling or causing to be enabled support for PASID operations of the first and second I/O hardware devices, respectively setting a first and a second PASID Extended Capability indicator of a first and second PASID Capability Register of the first and second I/O hardware devices.

18. The method of claim 14, wherein the process or container is assigned to a proper subset of a total number of processor cores included in the host device.

19. One or more computer readable media having instructions thereon that, in response to respective execution by first and second one or more processor cores of a first and a second apparatus, cause the first and second apparatus to perform operations of the method of claim 14 performed by the first and second I/O hardware devices.

20. An apparatus comprising first and second means for respectively performing operations of the method of claim 14 performed by the first and second I/O hardware devices.

21. A method for utilizing resources of a first and a second input/output (I/O) hardware device communicatively coupled with a host device, comprising:
respectively receiving, by the first and second I/O hardware devices, from the host device, a Process Address Space Identifier (PASID) associated with a first of a first plurality of queue pairs of the first I/O hardware device and a second of a second plurality of queue pairs of the second I/O hardware device, wherein each of the first and second queue pairs includes two complementary queues, wherein the PASID is a PASID of a process or container being executed by the host device in parallel with other processes or containers being executed by the host device, wherein the first and second queue pairs are owned by the process or container upon association with the PASID, and are part of an isolated I/O hardware device partition associated with the process or container; and wherein other individual queue pairs of the first and second plurality of queue pairs of the first and second I/O hardware devices are selectively associated with the other processes or containers executed in parallel via their respective PASIDs to form respective isolated I/O hardware device partitions for the other processes or containers being executed in parallel;
generating, by the first or second I/O hardware device, a Transaction Layer Packet (TLP) including the PASID; and
providing, by the generating first or second I/O hardware device, the TLP to the host device as part of a Direct Memory Access (DMA) transaction for the process or container being executed in parallel with other processes or containers by the host device.

22. The method of claim 21, wherein the first and the second I/O hardware devices are Peripheral Component Interconnect Extended (PCIe) devices.

23. The method of claim 21, wherein the first or the second I/O hardware device is a Network Interface Controller (NIC) or a Non-Volatile Memory Express (NVMe) controller.

24. The method of claim 21, wherein the DMA transaction is processed at the host device by an Input/Output Memory Management Unit (IOMMU) of the host device.

* * * * *